July 14, 1953 W. S. EDSALL ET AL 2,645,690

THERMAL PROTECTOR FOR CONDUCTOR INSULATION

Filed April 24, 1951 5 Sheets-Sheet 1

INVENTORS
William S. Edsall
Paul C. Hitchcock
BY their Atty.
John H. McKenna

THERMAL PROTECTOR FOR CONDUCTOR INSULATION

Filed April 24, 1951 5 Sheets-Sheet 2

INVENTORS
William S. Edsall
Paul C. Hitchcock
BY their Atty.
John H. McKenna

July 14, 1953 W. S. EDSALL ET AL 2,645,690

THERMAL PROTECTOR FOR CONDUCTOR INSULATION

Filed April 24, 1951 5 Sheets-Sheet 3

INVENTORS
William S. Edsall
Paul C. Hitchcock
BY their Atty.
John H. McKenna

INVENTORS
William S. Edsall
Paul C. Hitchcock
BY their Atty.
John H. McKenna

THERMAL PROTECTOR FOR CONDUCTOR INSULATION

Filed April 24, 1951 5 Sheets-Sheet 5

INVENTORS
William S. Edsall
Paul C. Hitchcock
BY their Atty.,
John H. McKenna

Patented July 14, 1953 2,645,690

UNITED STATES PATENT OFFICE 2,645,690

THERMAL PROTECTOR FOR CONDUCTOR INSULATION

William S. Edsall, Boston, and Paul C. Hitchcock, Lawrence, Mass., assignors to The Chase-Shawmut Company, Newburyport, Mass., a corporation of Massachusetts Application April 24, 1951, Serial No. 222,658

25 Claims. (Cl. 200—113)

This invention relates to protection against overheating of electric conductors and more particularly to protection against heat-damage to the insulation of insulated electric cables and bus-bars.

Some electric conductors as, for instance, cables which are covered by a suitable insulating material must be protected against overloads and against short-circuit currents. This invention is more particularly concerned with the former kind or protection.

Thermal protection against overloads calls for an inverse time current characteristic, i. e., the circuit should be interrupted relatively rapidly if the rate of current flow is relatively high and the circuit should be interrupted only at the end of a relatively long period of time if the rate of current flow is relatively low. The interruption in each case, however, should be in response to the temperature of the insulated conductor which is being protected. While prior art protective devices for electric conductors as, for instance, cables have an inverse time current characteristic, it has not been possible heretofore to achieve substantial similarity between the danger characteristic of the insulation of a cable or other conductor and the interrupting characteristic of the protective device provided for its protection. It is, therefore, an object of this invention to provide a protective system and a protective device therefor having an interrupting characteristic which is much closer to the danger characteristic of the insulation of the cable or other conductor to be protected than in prior art systems and devices.

A more specific object of this invention is to provide a protective system and a protective device therefor having an interrupting characteristic which is very close to, or substantially identical with, the danger characteristic of the insulation of the cable or other conductor to which it is applied.

Protection of the insulation af cables and of other conductors was effected heretofore by means of "thermal models" which simulated as closely as possible the rise and fall of the temperature in the cable or other conductor. Because of the imperfection of such "thermal models" continuity of service was frequently interrupted though the danger point of the cable or other conductor had not been reached as yet. It is, therefore, another object of this invention to provide protective means which preserve continuity of service as long as the danger point of the cable or other conductor to which they are applied has not been closely approached and which means are also adapted to effect a high degree of coordination with the protected cable or other conductor over a wide range of overload currents.

Insulation protection depends, as above indicated, on both time and current. In other words, insulation protection depends on time elapsed and temperature acquired by the insulated conductor. If protective devices cause interruption of circuits before the current carrying ability of insulated conductors has been fully utilized, more copper per ampere than inherently necessary must be installed to carry the required load. It is, therefore, another object to provide protective means which enable to reduce the amount of copper per ampere that must be installed in a given distribution system to the minimum determined by the thermal characteristics of the insulated conductors by which the system is made up.

It is another object of this invention to provide a cable protector wherein the amount of contact resistance is minimized as long as the circuit remains closed, wherein circuit interruption is effected by the combined action of fusion and contact separation and wherein the current path is such as to preclude any electromagnetic stresses due to the circulation of currents of short-circuit current proportions.

Still another object of this invention is to provide protective means particularly suited for underground cable systems, combining the most desirable thermal and electrical characteristics with such mechanical characteristics as utmost simplicity and watertightness.

Further objects and advantages of this invention will become apparent as the following description proceeds and the features of novelty which characterize this invention will be pointed out with particularity in the claims annexed to and forming part of this specification.

For a better understanding of this invention reference may be had to the accompanying drawings in which Fig. 1 is a diagram of a secondary network provided with protective devices embodying this invention;

Figures 4, 4A, 5, 8:
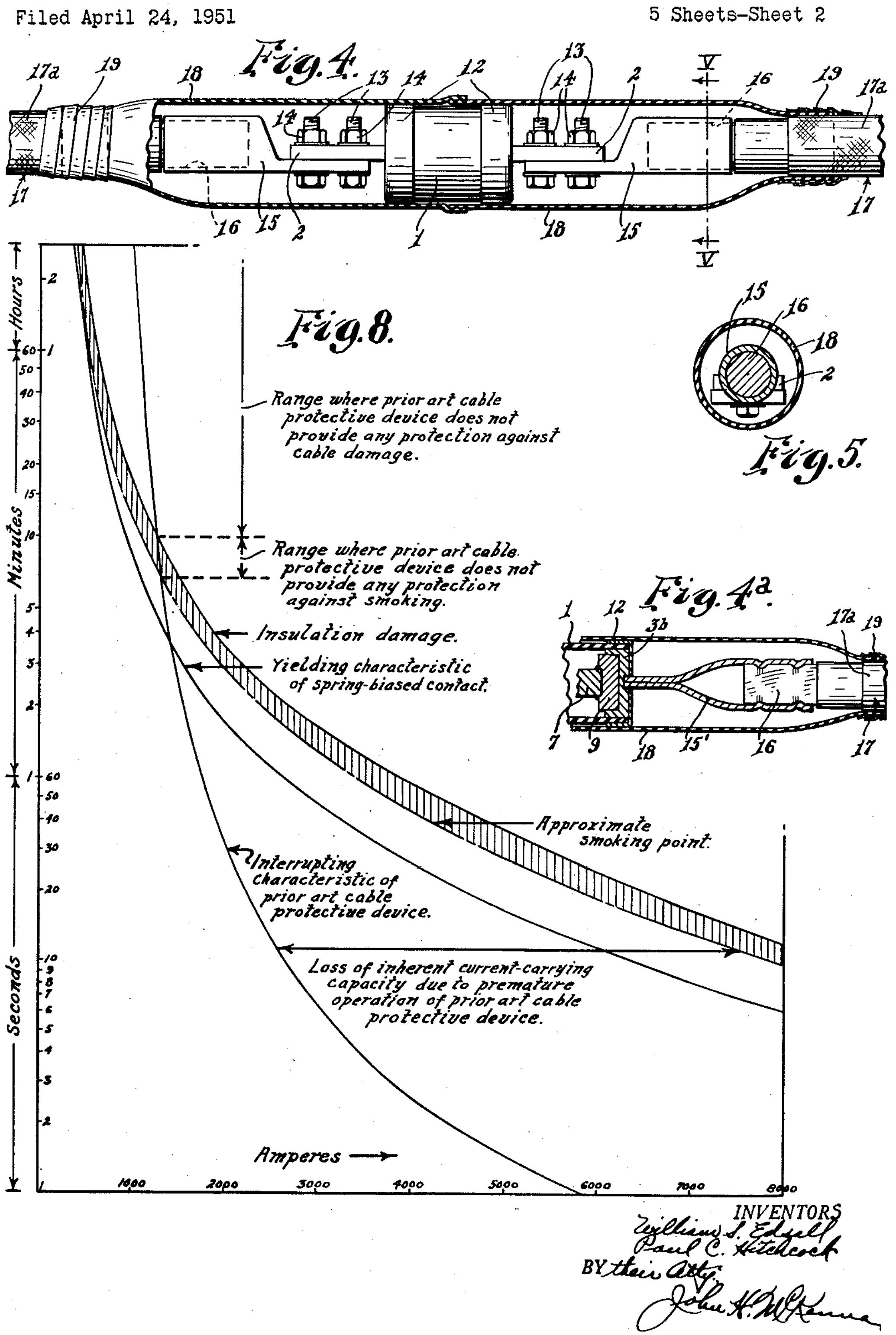
Fig. 4 is an elevational view, partly in cross-section, showing how the structure of Figs. 2 and 3 is associated with an underground cable.
Figure 6:
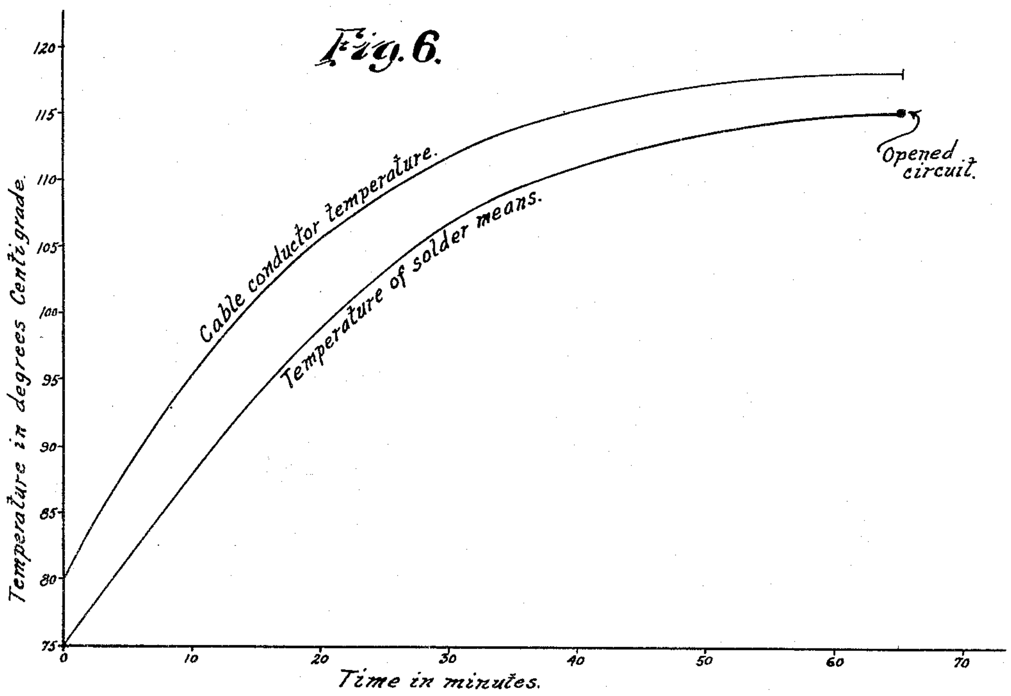
Figure 7:
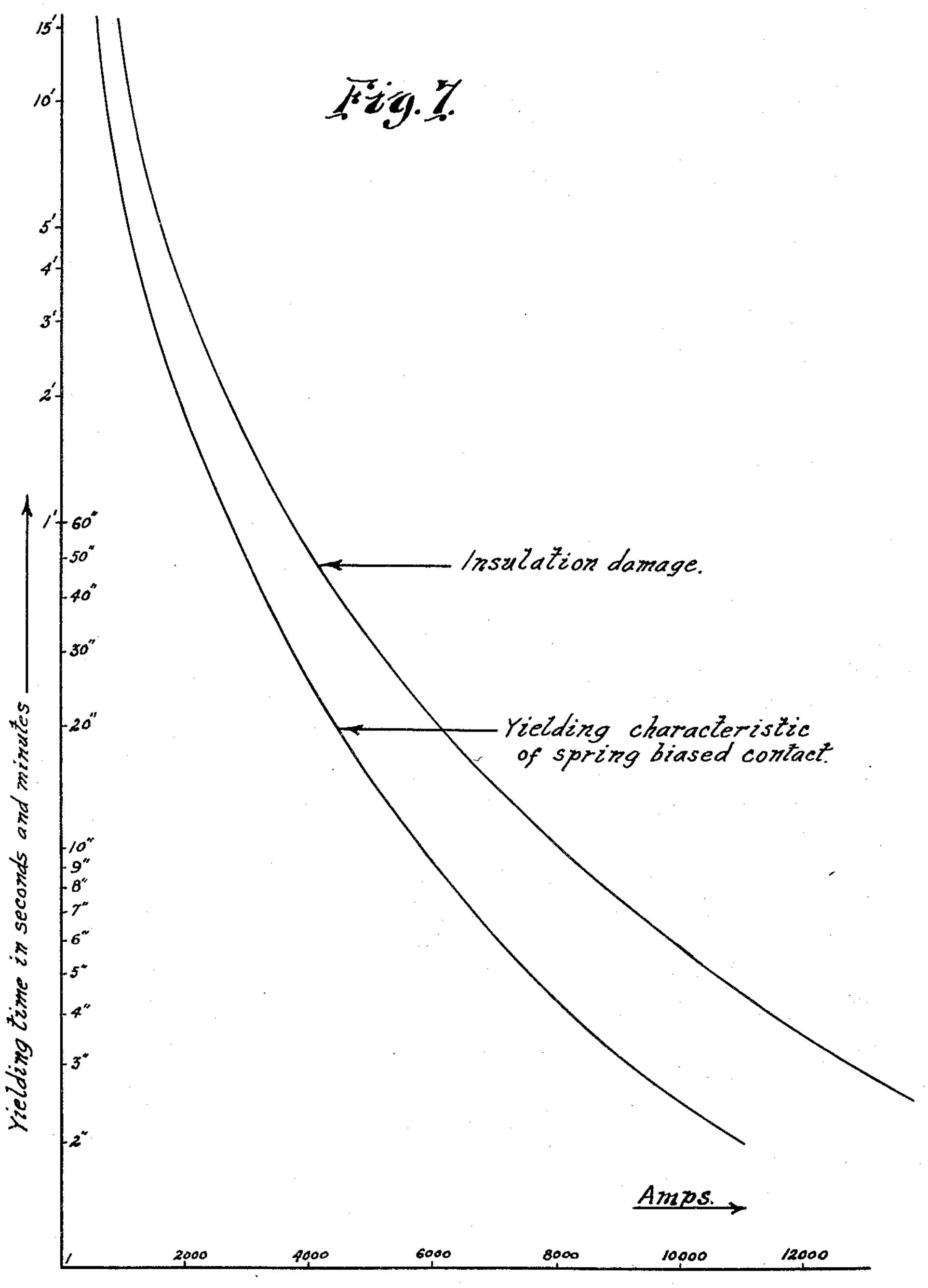
Figure 9:
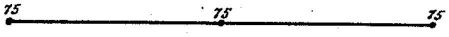
Figure 9A:
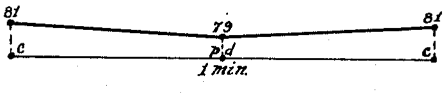
Figure 9B:
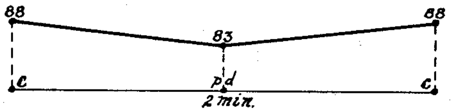
Figure 9C:
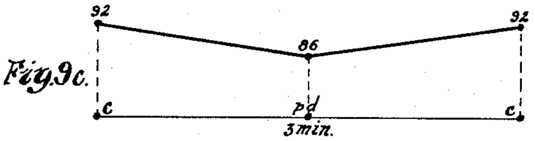
Figure 9D:
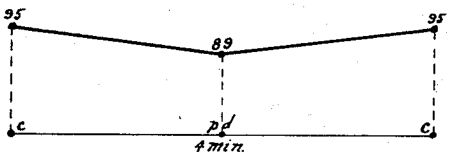
Figure 9E:
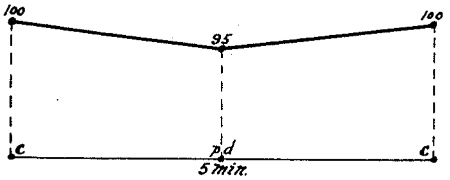
Figure 9F:
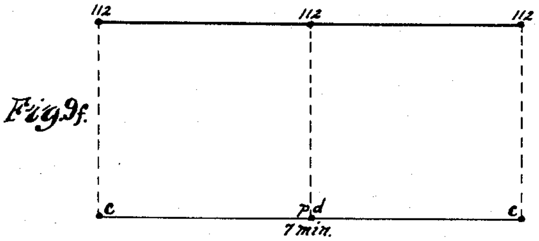
Figure 9G:
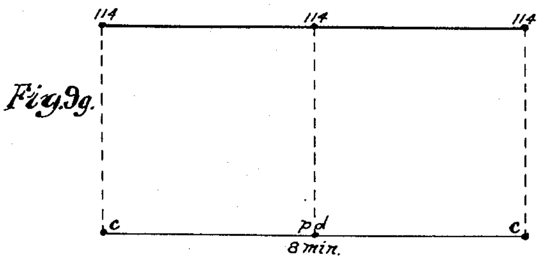

Fig. 4*a* is a fragmentary view, mostly in cross-section, showing a modified form of connector between the protective device and a terminal of the cable;

Fig. 5 is a section along line V—V of Fig. 4;

Fig. 6 shows typical temperature versus time curves of a cable and of a protective device embodying this invention;

Fig. 7 shows typical time versus current curves of a cable and a protective device embodying this invention;

Fig. 8 shows curves similar to those shown in

Figure 12:
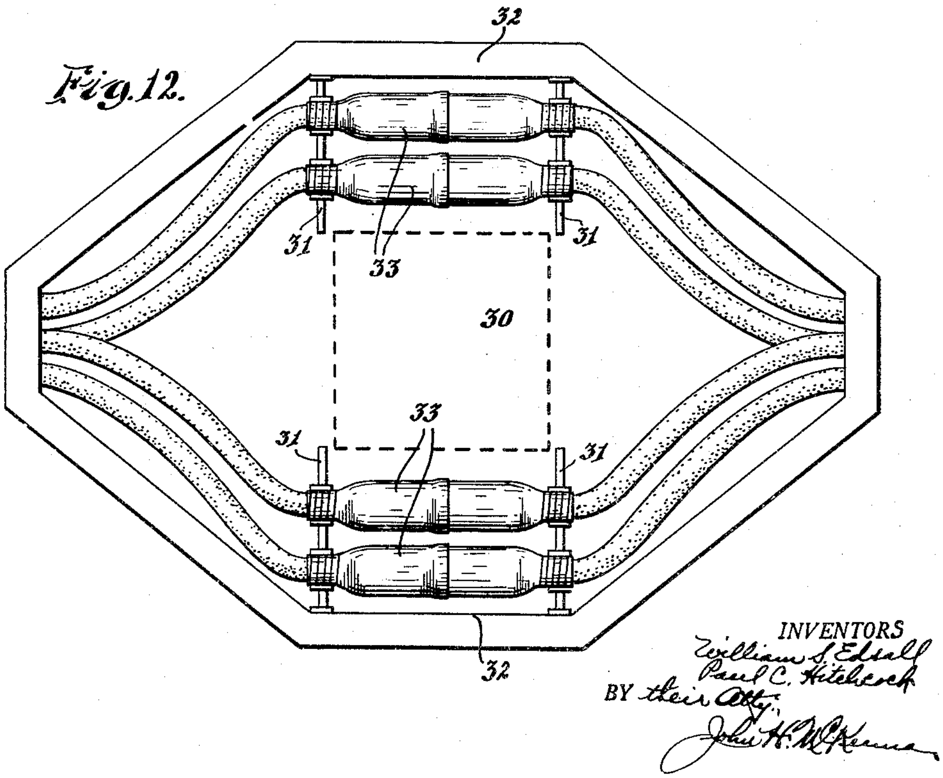
Figure 10:
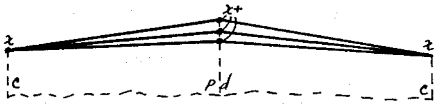
Figure 11A:
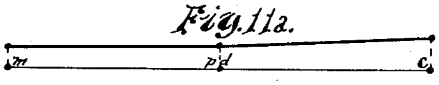
Figure 11B:
Figure 11C:
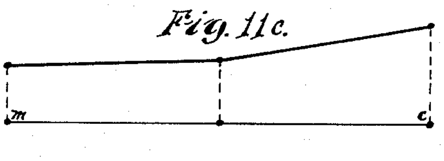
Figure 11D:
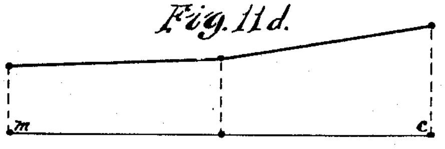

Fig. 7 and indicates, in addition thereto, important distinctions between protective systems embodying this invention and prior art protective systems;

Figs. 9 and 9*a* to 9*g* refer to a cable protector embodying this invention and two lengths of cable between which the protector is arranged and show sequential stages of temperature distribution along the common axis of the cable protector and the two lengths of cable;

Fig. 10 refers to a prior art cable protector and lengths of cable between which the protector is arranged;

Figs. 11*a* to 11*d* refer to a cable protector according to this invention which is arranged between a length of cable and a system having a large heat dissipating and heat absorbing capacity and in which but little heat is being generated, for instance, a bus bar system and shows sequential stages of temperature distribution along the common axis of the cable, the cable protector and the above system; and Fig. 12 is a top plan view of several cable protectors embodying this invention arranged in a manhole in a distribution system.

Figure 1:
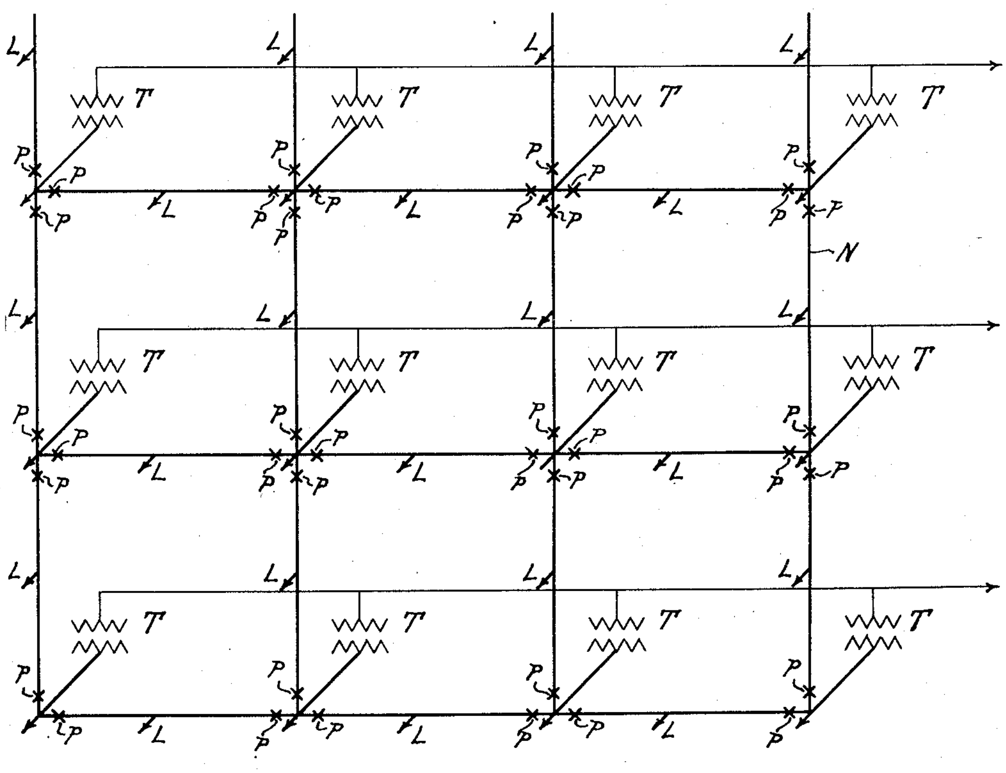

Referring now to Fig. 1, the secondary network N is supplied at each of a plurality of points by a transformer T. Reference numerals L have been applied to indicate the load of the network N. The network N is made up of a system of underground cables arranged in suitable underground ducts. Each length of cable is protected by a pair of protective devices P which are arranged at opposite ends thereof.

Figures 2, 3:
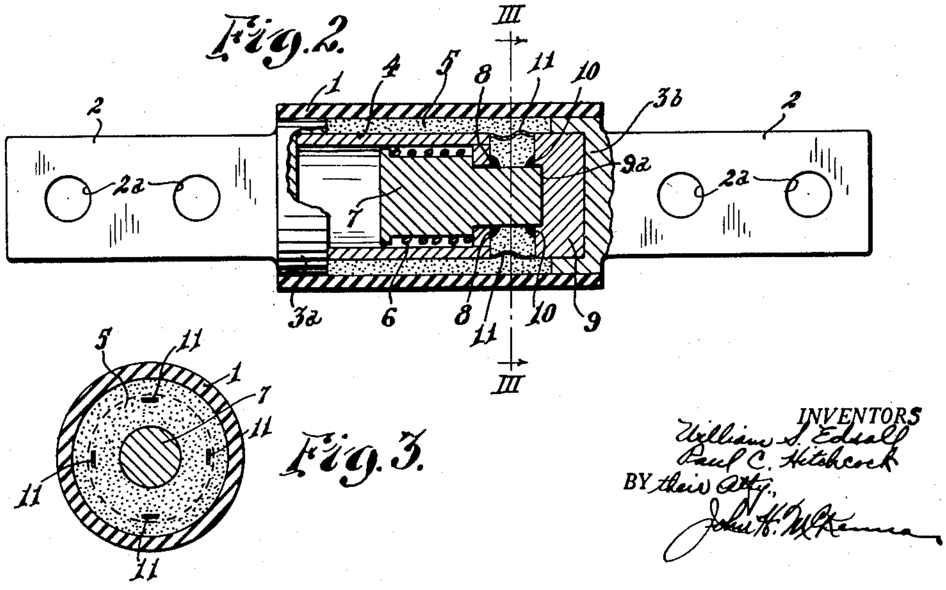
Fig. 2 is a side view, partly in cross-section, of a part of a protective device embodying this invention.
Fig. 3 is a cross-section along line III—III of Fig. 2.

In Figs. 2 and 3 which show some of the essential parts of a protective device according to this invention, reference numeral 1 has been applied to a tubular housing made of insulating material having a considerable mechanical strength. Knife or bar type connectors 2 with holes 2*a* for the passage of screws (not shown in Figs. 2 and 3) extend in opposite directions from housing 1. The left hand connector 2 is secured to a cylindrical metal body 3*a* of relatively considerable mass adapted to close housing 1 at the left side thereof. The right hand connector 2 is secured to a similar cylindrical metal body 3*b* of relatively considerable mass adapted to close housing 1 at the right side thereof. The metallic sub-housing 4 is coaxially arranged within housing 1 and is supported by the metal body or terminal header 3*a* whose inner face is recessed for reception of an end portion of sub-housing 4. A pulverulent arc-quenching filler 5 is arranged within housing 1 outside the metallic cylindrical sub-housing 4. A helical biasing spring 6 is arranged within sub-housing 4. This spring acts between a contact member 7 and the sub-housing 4 and tends to move said member from the position shown in Fig. 2 to the left. Sub-housing 4 and contact member 7 are conductively interconnected by a solder means 8. The cylindrical metal body 3*b* on the right bar connector 2 is recessed for reception of the contact member 9, and contact member 9 has a recess 9*a* into which contact member 7 projects. Contact members 7 and 9 are conductively interconnected by a solder means 10. Upon sufficient heating of solder means 8 and 10 by heat conducted to them along connector blades 2, the solder means yield to the action of biasing spring 6, resulting in separation of contacts 7 and 9. The arc so formed is effectively cooled and deionized by the pulverulent arc-quenching filler 5 which flows into the arc gap under the action of gravity. The metal vapors evolved from the solder joint 10 have a relatively low ionization potential and it may be desirable for this reason to provide arc-extinguishing means which are more effective than the pulverulent filler 5 in and of itself. To provide for more effective arc-quenching, sub-housing 4 and contact 9 are interconnected by a plurality of fusible elements or fuse links 11 which are arranged in a substantially circular pattern around the longitudinal axis of housing 1 and are embedded in filler 5. Links 11 may be made, if desired, of a metal the vapors of which have a considerable dielectric strength at the boiling point temperature as, for instance, silver. However, this is generally not vitally necessary for effective arc suppression. Upon separation of contact of plunger 7 from contact 9 the gap so formed is shunted by the plurality of links 11 which draw all the current from that gap, resulting in rapid extinction of the arc formed between contacts 7 and 9. Owing to the fact that links 11 are caused to carry all the current upon extinction of the arc between contacts 7 and 9, links 11 will rapidly fuse. Since the ratio of current carried per link 11 to active surface of the surrounding filler is very favorable to rapid arc extinction, the arcing time within the device can be kept within relatively short limits and the pressure within housing 1 does never rise beyond the limits of the mechanical strength thereof.

Referring now to Fig. 4, reference numeral 1 has been applied to the housing structure indicated in Fig. 1 by the same numeral. To provide gas-tight seals, two caps 12 have been placed on housing or casing 1. The two bar connectors 2 project beyond housing 1 and are connected by means of bolts 13 and nuts 14 to cooperating connectors 15 fitted on spaced terminals 16 of a cable 17. Connectors 15 and terminals 16 are permanently joined together by solder, thus minimizing contact resistance and $i^2r$ losses at this point. It should be understood, however, that the connectors 15 and terminals 16 may be permanently joined together by any other suitable means, as by indenting the walls of connector 15 into the enclosed end portion of the cable or conductor terminal 16. A rubber bag 18 encloses housing 1, the pair of axially inner connector elements 2 and the pair of axially outer connector elements 15. Bag 18 laps the insulation 17*a* of cable 17. Each of a pair of windings 19 of insulating tape extends over the lapping portion of said rubber bag 18 to provide a watertight joint.

Fig. 4*a* shows a modified form of connector which may be employed between the cylindrical metal bodies 3*a* and 3*b* of Fig. 2 and the cable or conductor terminals 16 which are to be connected to them. In Fig. 4*a*, a metal tube 15' is flattened at one end portion and this flattened end is permanently secured to the outer face of the cylindrical metal body 3*b*. The other end portion of tube 15' constitutes a socket for reception of a cable or conductor terminal 16 which may be secured in the socket in any suitable manner, as by the illustrated indenting of the socket walls into the terminal 16.

The device shown in Figs. 1–5 is predicated upon heating of solder means 8 and 10 by heat from cable 17 and minimizing the heat generated in connectors 2 and 15 and in all the metal parts enclosed in housing 1. The ohmic resistance of the metallic elements connected between the two spaced terminals 16 of the cable 17 is so small that the heat generated therein does not significantly affect the temperature of solder joints 8 and 10. Solder joints 8 and 10 are heated predominantly by heat generated in the cable or otherwise acquired by the cable and conducted by metallic heat conduction to solder joints 8 and 10 as distinguished from thermoresponsive devices which are heated predominantly by radiation and convection or are heated by $i^2r$ losses occuring therein, or by a separate heater rather than directly by the conductor intended to be thermally protected.

Even if the joints between connectors 2 and 15 are carefully made and a great amount of pressure is applied, these joints will be the source of $i^2r$ losses. If these losses should be too high, the temperature prevailing at solder joints 8 and 10 might exceed the temperature of the cable 17 and under such circumstances effective protection of the cable could not be achieved. The pair of headers 3*a* and 3*b* is adapted to dissipate heat approximately at the same rate as heat is being generated by the passage of current from terminals 16 and connectors 15 to connectors 2 to compensate for heat so generated, i. e. heat generated on account of contact resistance. Thus the temperature prevailing at solder joints 8 and 10 can be maintained at levels which are truly indicative of the temperature of the cable.

The cross-sectional area of contact or plunger 7 is substantially the same as the cross-sectional area, in circular mils, of the cable or other conductor which is being protected, and has substantially the same current-carrying ability.

The temperature which a cable can withstand depends upon the time the temperature is being maintained. The withstand times are relatively long if the temperature is relatively low. The withstand times are relatively short if the temperature is relatively high. In the arrangement according to this invention the electrical and the thermal characteristics of the cable and the electrical and thermal characteristics of the means for carrying current from the terminals 16 of the cable 17 to the contact means 7, 9, and of the solder means 8, 10 are so correlated that the temperature at the solder means never exceeds the temperature at said terminals throughout the load and overload range of the cable. Therefore, there will generally be a flow of heat from the cable 17 toward the solder joints 8, 10 but never an appreciable reverse heat flow. If the temperature of the cable is relatively high, the yielding point of solder points 8, 10 will be reached after a relatively short period of time; if the temperature of the cable is relatively low, the yielding point of solder joints 8, 10 will be reached only after a relatively long period of time. The solder joints have a yielding point which is below the continuous danger temperature of cable 17, i. e. below the lowest temperature which, if continuously maintained, would harm the cable. On currents which are so small as to become dangerous only if continuously maintained for very long periods of time, the time required for the solder joints 8 and 10 to reach the yielding point is correspondingly long. The higher the current, the shorter the time required for the solder joints 8 and 10 to reach the yielding point.

The continuous danger temperatures of cables are slightly above the maximum permissible temperatures. Both the continuous danger temperature and the maximum permissible temperature vary greatly with the material of which the insulation of the cable is made and to some extent also with the make of the cable. Approximate values for the maximum permissible continuous temperatures for low voltage cables expressed in degrees centigrade are tabulated below.

| | |
|---|---|
| Impregnated paper | 85 |
| Varnished cambric | 75 |
| Rubber insulation | 50–60 |

Modern cables have considerably higher continuous danger temperatures and permissible temperatures, respectively. A modern cable known by the trade as "4/0 Simplex Anhydrex" is capable of withstanding without damage continuous temperatures between 75 and 120 degrees centigrade. This particular cable has a maximum permissible continuous temperature rating of 115 degrees centigrade.

Thermoresponsive overload protective devices predicated upon the concept of the "thermal model" are generally operated at relatively high temperatures to prevent changes of the ambient temperature to significantly affect the tripping of the device. Where the operating temperature of such a device is relatively low for one reason or another, its tripping accuracy tends either to be poor or must be held within tolerable limits by the provision of additional means adapted to compensate for the effects of changes in ambient temperature. The systems and devices according to this invention operate at much lower temperatures than usually encountered in devices predicated upon the "thermal model" concept, but no disadvantages result from this fact because the systems and devices according to this invention are predicated upon a direct measurement of the actual temperature of the cable rather than upon that prevailing in a "thermal model" of the cable. It follows from the foregoing that the solder means or eutectic alloys which are generally used in thermoresponsive overload protective devices predicated upon the concept of the "thermal model" are not suited for the systems and devices according to this invention. Such systems and devices require solder means or eutectic alloys which cause circuit interruption at relatively low temperatures, say between 60 and 120 degrees centigrade, depending upon the properties of the particular cable intended to be protected.

The yielding point of any solder joint is defined in terms of temperature at a predetermined stress. Below are given two formulae used to arrive at the desired yielding points in connection with the structure of Figs. 1 to 4.

| | | |
|---|---|---|
| I. | 45.02% | Pb |
| | 51.72% | Bi |
| | 6.89% | Cd |
| II. | 50.10% | Pb |
| | 49.72% | Bi |
| | .11% | Sb |

The above formulae are but two of some seventy or more which are available.

The yielding point of the first mentioned composition was from 81–84 degrees centigrade. The yielding point of the second mentioned composition was from 113–116 degrees centigrade. This composition was particularly developed for the protection of the above referred to "4/0 Simplex Anhydrex" cables having a maximum permissible continuous temperature rating in the order of 115 degrees centigrade.

Referring now to Fig. 8, the abscissae in this figure are linear and the ordinates logarithmic.

The abscissae indicate currents in R. M. S. amperes and the ordinates times in minutes, seconds and hours. The curves relate to a cable of the previously mentioned "4/0 Simplex Anhydrex" type. The curve marked "insulation damage" indicates the shortest times at which the insulation of the cable would be damaged if continuously carrying the load indicated, assuming that substantially all of the heating is due to $i^2r$ losses in the cable. A cable is permanently damaged when heat causes its insulation to become either hygroscopic or brittle. Before sustaining permanent damage a cable begins to evolve smoke. The curve marked "approximate smoking point" indicates the times within which the insulation of the cable would begin to smoke if the cable was continuously carrying the load indicated. Though smoking or initiation of smoke evolution does not cause any permanent damage to a cable, it is desired to interrupt a circuit shortly before the time smoke evolution would occur. The ideal characteristic of a thermal cable protector is, therefore, a curve which lies slightly below the "insulation damage" and the "approximate smoking point" characteristic along a wide current range, virtually the entire load and overload range, of the cable under consideration. Such an ideal interrupting characteristic could not be achieved with the protective systems and the protective devices which were known heretofore. The curve in Fig. 8 marked "interrupting characteristic of prior art cable protective device" refers to a device which is currently extensively used for cable protection. It is apparent that this device does not offer any protection against protracted overloads in the moderate overload range, i. e. it interrupts these overloads only after the insulation of the cable has suffered permanent damage. For a given range of overcurrents the prior art device becomes operative only after initiation of smoke evolution. As far as medium currents and high currents are concerned, the prior art device causes circuit interruption too long a time prior to the time at which the insulation of the cable would be damaged, or caused to evolve smoke, by the heat in the cable. There is obviously a loss of inherent current carrying capacity of the cable due to premature operation of the prior art cable protector in the medium current and high current ranges.

The curve in Fig. 8 marked "yielding characteristic of spring biased contact" refers to the structure of Figs. 2 to 5 and more particularly to the behavior of solder joints 8 and 10 when acted upon by spring 6. This structure permits, as is readily apparent from Fig. 8, a degree of "coordination" with the cable to be protected which could not be achieved with any prior art cable protective system or device.

Fig. 7 shows curves of the same nature as Fig. 3. The space between the curve marked "insulation damage" and the curve marked "yielding characteristic of spring biased contact" is a measure for the times $\Delta t$ the circuit is interrupted prior to damage to the cable. It will be observed that the times $\Delta t$ are reasonably short, thus permitting extensive use of the inherent carrying ability of the cable. This should be compared with the behavior of the prior art cable protective device the interrupting characteristic of which is shown in Fig. 8. As far as the prior art device is concerned, the times $\Delta t$ decrease with decreasing currents until insufficient or no protection to the cable is offered any longer.

It is apparent from Fig. 8 that the electrical and thermal characteristics of the cable and the electrical and thermal characteristics of the current carrying means of the protective device including its contact means and solder means are so correlated that the differences between the yielding times of said solder means and the smoking times increase with decreasing load currents.

Fig. 6 refers to a "4/0 Simplex Anhydrex" cable protected by a device of the kind shown in Figs. 2–5. Minutes are linearly plotted along the axis of abscissae of Fig. 6 and centigrades are linearly plotted along the axis of ordinates of this figure. The cable was subjected continually to a continuous flow of 600 R. M. S. amperes. The ambient temperature was 26 degrees centigrade. Readings were started at a time when the cable had reached a temperature of 80 degrees centigrade and the solder means 8, 10 (see Figs. 2–5) had reached a temperature of 75 degrees centigrade. Both temperature versus time characteristics obtained during this heat run are in the nature of exponential curves. The circuit was interrupted 65 minutes after readings had begun and at this time the temperature of the solder means for controlling the operation of the device had reached a predetermined maximum allowable temperature of 115 degrees centigrade.

Fig. 6 makes it very clear that the electrical and thermal characteristics of the cable and the electrical and the thermal characteristics of the current carrying means for carrying current from the cable to the contacts 7, 9 and the solder means 8, 10 are so correlated that said solder means never exceed the temperatures of the cable prevailing adjacent the terminals thereof, i. e. that the temperature of the solder means is primarily governed by the temperature at the terminals of the cable rather than by $i^2r$ losses occurring within the cable protective device.

An approximate but significant measure for the electrical and thermal characteristics of a protective device of the kind shown in Figs. 2–5 is the ratio of the mass of the device to the mass of an equal length of bare cable. An increase of this ratio e. g. above 2.5 tends to increase the time lag between the temperature of the cable and the temperature of the heat responsive solder means in the high overload current range. However, at low currents the increase in mass has little or no effect on time lag. The effect of the above ratio becomes more apparent from the data below which refer to two comparative heat runs made with a length of "4/0 Simplex Anhydrex" cable and two interrupting devices having substantially the same geometrical configuration except that in one case the above ratio was 3.7 and in the other case 2.5.

The 3.7 ratio device was tested with loads of 520 and 900 amperes. In the 520 ampere test the temperature of the solder means 8 and 10 remained lower than that of the cable during 85 minutes. At or after 85 minutes the temperature of the cable and that of the solder means remained stationary at 113 degrees centigrade. The following measurements were made during the 900 ampere test.

| Time, min. | Cable Temperature, deg. C. | Temperature at Solder Means, deg. C. |
|---|---|---|
| 3 | 125 | 85 |
| 6 | 149 | 94 |
| 9 | 169 | 105 |
| 11 | 177 | 114 |

The 2.5 ratio device was tested with loads of 420 and 800 amperes. In the 420 ampere test the temperature of the solder means 8 and 10 increased at about the same rate as that of the cable until a stationary temperature of 75 degrees centigrade was reached. The following measurements were made during the 800 ampere test.

| Time, min. | Cable Temperature, deg. C. | Temperature at Solder Means, deg. C. |
|---|---|---|
| 1 | 81 | 79 |
| 2 | 88 | 83 |
| 3 | 92 | 86 |
| 4 | 95 | 89 |
| 5 | 100 | 95 |
| 7 | 112 | 112 |
| 8 | 114 | 114 |

Opening and interruption of the circuit occurred after 8 minutes when the temperature of the cable and that of the solder means had become equal.

In the instant case reduction of the mass ratio improved the time temperature coordination of the cable protector with the characteristic of the cable.

In the above tests the cable protector was arranged between two 25 feet lengths of cable and the latter were connected to a suitable low voltage current source. Thermocouples were mounted in the two lengths of cable each about 12½ feet away from the cable protector. These thermocouples were arranged between the copper of the cable and the first layer of insulation. Another thermocouple was mounted on the plunger of the cable protector.

Figs. 9 and 9*a*–9*g* are diagrammatic representations of the six sequential phases of temperature distribution along the common axis of the cable and the cable protector as listed in the above table. The ordinates above the points *pd* indicate the temperature within the protective device and the ordinates at the points *c* indicate the temperatures at two points of the cable equally spaced from the protective device.

Fig. 10 is a diagrammatic representation showing the temperature distribution along the common axis of a cable and a prior art cable protector; the temperatures $x^+$ within the prior art protective device are higher than the simultaneous cable temperatures indicated as $x$ in Fig. 10. Comparing Fig. 10 with Figs. 9 and 9*a*–9*g*, none of the central ordinates in Figs. 9 and 9*a*–9*g* are above the connected terminal ordinates. In Fig. 10, all of the central ordinates are above the connected terminal ordinates, indicating that the temperatures $x^+$ of the prior art protector are higher than the cable temperatures $x$.

Figs. 11*a*–11*d* are diagrammatic representations similar to Figs. 9 and 9*a*–9*g* but the former refer to a case including a cable protector connected at one side thereof to a cable and on the other side thereof to a system having a large heat dissipating and absorbing capacity resulting in that the system has lower temperatures than the protective device. In this case the direction of heat flow is from the cable to the protective device and from the protective device to the above system.

While the mass ratio as above defined is indicative of the behavior of the cable protectors of the kind shown in Figs. 2–5, the temperature of the solder means within the cable protector depends on more than one factor, and more particularly upon the temperature level of the cable, the rate of heat generation and dissipation in the cable protector, the heat absorbing capacity of the cable protector and the ambient temperature.

Fig. 12 shows a manhole generally indicated by reference numeral 30. Racks or brackets 31 projecting from the manhole walls 32 support the cable protectors 33 which are readily accessible for replacement upon blowing by reason of a sustained overload.

An important feature of the device according to the invention resides in that the path of the current through it is substantially a straight line. Therefore the solder joints 8, 10 will never be subjected to appreciable electromagnetic stresses and strains which would tend to separate the contacts 7, 9 and might be of disastrous consequences in the case of fault currents of short-circuit current proportions.

It will be apparent that while the operation of the cable protector is governed by the temperature of the cable immediately adjacent the protector, the cable might have a considerably higher temperature at points situated closer to the center of a given length of cable. Since there is a direct relation between the temperature at any point of a cable, the temperature at each end is a direct indication of the temperature prevailing at the middle and the former is adequate for the control of a cable protector, provided that the yielding point of the solder means of the cable protector is so low that the solder means yield before any point of the cable is subjected to too high a temperature for a too long duration.

While in accordance with the patent statutes, we have disclosed the details of a preferred embodiment of our invention, it is to be understood that many of these details are merely illustrative and variations in their precise form will be possible or necessary depending upon the particular nature of application. We desire, therefore, that our invention be limited only to the extent set forth in the appended claims and by the prior art.

We claim as our invention:

1. An arrangement for the protection against overheating of the insulation of a conductor in an electric power circuit comprising an electric conductor adapted to carry heavy currents, means for insulating said conductor, a housing arranged in alignment with said conductor, separable contact means arranged within said housing, spring means for biasing said contact means to the open position thereof, solder means for conductively interconnecting said contact means and for normally restraining said contact means in the closed position thereof, the yielding point of said solder means being below the continuous danger temperature of said means for insulating said conductor, means within said housing for quenching the arc formed upon yielding of said solder means and separation of said contact means under the action of said spring means, and current carrying means including connector means for carrying current from said conductor to said contact means and said solder means, the electrical and the thermal characteristics of said conductor and the electrical and the thermal characteristics of said current carrying means, said contact means and said solder means being so correlated that the temperatures at said solder means never throughout the load and overload range of said conductor exceeds the temperature at points of said conductor remote from said solder means.

2. An arrangement for the protection against overheating of the insulation of a cable in an electric power circuit comprising an insulated cable forming a gap between two spaced terminals thereof, a tubular housing arranged within said gap in alignment with said terminals, separable contact means arranged within said housing, spring means for biasing said contact means to the open position thereof, solder means for conductively interconnecting said contact means and for normally restraining said contact means in the closed position thereof, the yielding point of said solder means being below the continuous danger temperature of the insulation of said cable, means within said housing including a pulverulent filler for quenching the arc formed upon yielding of said solder means and separation of said contact means under the action of said spring means, current carrying means including a pair of bar connectors projecting beyond opposite ends of said housing for connecting said terminals of said cable to said contact means and said solder means, the electrical and the thermal characteristics of said cable and the electrical and thermal characteristics of said current carrying means, said contact means and said solder means being so correlated that the temperatures of said solder means never throughout the load and overload range of said cable exceed the temperatures of said cable at points thereof remote from said solder means.

3. An arrangement for the protection against overheating of the insulation of a cable in an electric power circuit comprising an insulated cable forming a gap between spaced terminals thereof, a housing arranged within said gap in alignment with said terminals, separable contact means arranged within said housing, spring means biasing said contact means to the open position thereof, solder means for conductively interconnecting said contact means and for normally restraining said contact means in the closed position thereof, the yielding point of said solder means being slightly below the continuous danger temperature of the insulation of said cable, a pulverulent filler within said housing surrounding said solder means for quenching the arc formed upon separation of said contact means, and current carrying means including a pair of connectors projecting beyond opposite ends of said housing for conductively connecting said terminals of said cable to said contact means and said solder means, the electrical and the thermal characteristics of said cable and the electrical and the thermal characteristics of said current carrying means, said contact means and said solder means being so correlated that the temperatures of said solder means never throughout the load and overload range of said cable exceed the temperatures of said cable at points thereof remote from said solder means and that the yielding time versus current characteristics of said solder means is spaced from the insulation damage versus current characteristic of said cable throughout substantially the entire load and overload range thereof.

4. An arrangement for the protection against overheating of the insulation of a cable in an electric power circuit comprising an insulated cable forming a gap between spaced terminals thereof, a housing arranged within said gap in alignment with said terminals, separable contact means arranged within said housing, spring means for biasing said contact means to the open position thereof, solder means for conductively connecting said contact means and for normally restraining said contact means to the closed position thereof, the yielding point of said solder means being slightly below the highest temperature which the insulation of said cable is capable of withstanding continuously without evolution of smoke therefrom, a pulverulent filler within said housing surrounding said solder means for quenching the arc formed upon separation of said contact means, and current carrying means including a pair of connectors projecting beyond opposite ends of said housing for conductively connecting said terminals of said cable to said contact means and said solder means, the electrical and the thermal characteristics of said cable and the electrical and the thermal characteristics of said current carrying means, said contact means and said solder means being so correlated that the temperatures of said solder means never throughout the load and overload range of said cable exceed the temperatures of said cable at points thereof spaced from said solder means and that the yielding time versus current characteristic of said solder means is spaced from the smoking point versus current characteristic of said cable throughout the entire load and overload range thereof.

5. An arrangement for the protection against overheating of the insulation of a cable in an electric power circuit comprising an insulated cable forming a gap between spaced terminals thereof, a housing arranged within said gap in alignment with said terminals, separable contact means arranged within said housing, spring means for biasing said contact means to the open position thereof, solder means for conductively interconnecting said contact means and for normally restraining said contact means in the closed position thereof, the yielding point of said solder means being slightly below the continuous danger temperature of the insulation of said cable, a pulverulent filler within said housing surrounding said solder means for quenching the arc formed upon separation of said contact means, and current carrying means including a pair of connectors projecting beyond opposite ends of said housing for conductively connecting said terminals of said cable to said contact means and said solder means, the electrical and the thermal characteristics of said cable and the electrical and the thermal characteristics of said current carrying means, said contact means and said solder means being so correlated that the temperatures of said solder means never throughout the load and overload range of said cable exceed the temperature of said cable at points adjacent said terminals thereof, and that the differences between the yielding times of said solder means and the danger times of said cable increase with decreasing load currents.

6. An arrangement for the protection against overheating of the insulation of a cable in an electric power circuit comprising an insulated cable forming a gap between spaced terminals thereof, a housing arranged within said gap in alignment with said terminals, separate contact means arranged within said housing, spring means for biasing said contact means to the open position thereof, solder means for conductively connecting said contact means and for normally restraining said contact means to the closed position thereof, the yielding point of said solder means being slightly below the highest temperature which the insulation of said cable is capable of withstanding continuously without evolution of smoke therefrom, a pulverulent filler within said housing surrounding said solder means for quenching the arc formed upon separation of said contact means, and current carrying means including a pair of connectors projecting beyond opposite ends of said housing for conductively connecting said cable to said contact means and said solder means, the electrical and the thermal characteristics of said cable and the electrical and the thermal characteristics of said current carrying means, said contact means and said solder means being so correlated that the temperature of said solder means never throughout the load and overload range of said cable exceeds the temperatures of said cable adjacent said terminals thereof, and that the differences between the yielding times of said solder means and the smoking times of said cable increase with decreasing load currents.

7. A protective arrangement for cable systems comprising an electric power circuit, a protective device including a spring biased solder means arranged in series with said cable in said circuit, said spring biased solder means being thermally responsive at a temperature below the continuous danger temperature of said cable to interrupt said circuit, quenching means adjacent said solder means for extinguishing the arc incident upon interruption of said circuit, current carrying means interconnecting said cable and said solder means adapted to minimize the heat generated therein and to maximize the flow of heat from said cable to said solder means, and heat dissipating and storing means associated with said current carrying means adapted to produce at increasing load progressively decreasing time lags between the temperatures of said solder means and the temperatures prevailing at a predetermined point of said cable spaced from said solder means.

8. An arrangement for the protection against overheating of the insulation of a cable in an electric power circuit comprising an insulated cable forming a gap between spaced terminals thereof, a housing arranged within said gap in alignment with said terminals, separable contact means arranged within said housing, spring means for biasing said contact means to the open position thereof, solder means for conductively interconnecting said contact means and for normally restraining said contact means in the closed position thereof, the yielding point of said solder means being slightly below the continuous danger temperature of the insulation of said cable, a pulverulent filler within said housing surrounding said solder means for quenching the arc formed upon separation of said contact means, and current carrying means including a pair of connectors projecting beyond opposite ends of said housing for conductively connecting said terminals of said cable to said contact means and said solder means, the electrical and the thermal characteristics of said cable and the electrical and the thermal characteristics of said current carrying means, said contact means and said solder means being so correlated that the temperatures of said solder means never throughout the load and overload range of said cable exceed the temperatures of said cable at a predetermined point thereof remote from said solder means and that there is a lag progressively decreasing with increasing loads between said temperatures of said solder means and said temperatures of said cable at said predetermined point thereof remote from said solder means.

9. An arrangement for the protection against overheating of the insulation of a cable in an electric power circuit comprising an insulated cable forming a gap between spaced terminals thereof, a housing arranged within said gap in alignment with said terminals, separable contact means arranged within said housing, spring means for biasing said contact means to the open position thereof, solder means for conductively interconnecting said contact means and for normally restraining said contact means in the closed position thereof, the yielding point of said solder means being below the continuous danger temperature of the insulation of said cable, quenching means for extinguishing the arc formed upon yielding of said solder means and separation of said contact means, current carrying means including a pair of connectors projecting beyond opposite ends of said housing and a pair of headers arranged in contiguous relation with respect to said pair of connectors, said pair of connectors and said pair of headers conductively connecting said terminals of said cable to said contact means and said solder means and said pair of headers being adapted to dissipate heat at least approximately at the same rate as heat is being generated by the passage of current from said terminals to said connectors to compensate for heat so generated, the electrical and the thermal characteristics of said cable and the electrical and the thermal characteristics of said current carrying means and said contact means and said solder means being so correlated that the temperatures at said solder means never throughout the load and overload range of said cable exceed the temperatures of said cable adjacent said terminals and that there is throughout said range a lag under constant and under increasing load conditions between the time predetermined temperatures are being reached adjacent said terminals and the times said predetermined temperatures are being reached at said solder means.

10. An arrangement for the protection against overheating of the insulation of a cable in an electric power circuit comprising a length of insulated cable and a protective circuit interrupting device serially arranged with said length of cable in said circuit, said protective device including a housing and a spring biased solder joint arranged therein and adapted upon reaching of a predetermined temperature to interrupt the flow of current through said cable, the yielding point of said solder joint being below the continuous danger point of the insulation of said length of cable and the temperature of said solder joint being mainly governed for a substantial portion of the load and overload current range of said length of cable by the heat generated therein outside said housing as distinguished from solder joints mainly governed by heat locally generated immediately adjacent thereto within a housing for the solder joint.

11. In a secondary network a pair of feeding points, a cable interconnecting said pair of feeding points, a pair of protective devices arranged in series with said cable each adjacent opposite ends thereof, each of said pair of protective devices including a housing and a spring biased solder joint arranged therein and adapted to interrupt the flow of current through said cable upon reaching of a predetermined temperature below the continuous danger point of said cable, the temperature of each said solder joint in each said housing of each said pair of protective devices being substantially governed for a substantial portion of the load and overload current range of said cable by the heat generated in said cable outside of each said housing as distinguished from solder joints mainly governed by heat locally generated immediately adjacent thereto within a housing for the solder joint.

12. In an arrangement for the protection against overheating of a conductor in an electric power circuit the combination of an electric power circuit, a conductor forming part of said circuit, a protective device arranged in series with said conductor in said circuit, said protective device comprising a tubular housing, a pulverulent arc quenching filler within said housing and current carrying means conductively connected to said conductor extending within said housing and projecting beyond both ends thereof, said current carrying means including separable contact means spring biased to the open position thereof, said current carrying means further comprising a solder means for conductively connecting and for normally restraining said contact means in the closed position thereof, the yielding point of said solder means being but slightly below the highest temperature which said conductor is capable of withstanding continually, said current carrying means being constructed to have a rate of heat generation, a rate of heat dissipation and a heat absorbing capacity so correlated to the electrical and the thermal characteristics of said conductor that the temperatures of said solder means are less throughout a preponderant portion of the load and overload range of said conductor than the temperatures of said conductor at a predetermined point thereof remote from said contact means and solder means.

13. In an arrangement for the protection against overheating of a cable the combination of an electric power circuit, a length of cable forming part of said circuit, a protective device arranged in series with said length of cable in said circuit, said protective device comprising a tubular housing, a pulverulent arc quenching filler within said housing, and current carrying means conductively connected to said cable extending within said housing and projecting beyond both ends thereof, said current carrying means including separable contact means spring biased to the open position thereof, said current carrying means further including solder means for conductively interconnecting said contact means and for normally restraining said contact means in the closed position thereof, the yielding point of said solder means being but slightly below the highest temperature which the insulation of said length of cable is capable of withstanding continually, said current carrying means being constructed to have a rate of heat generation, a rate of heat dissipation and a heat absorbing capacity so correlated to the electrical and thermal characteristics of said length of cable that the temperatures at said solder means never throughout the load and overload range of said length of cable exceed the temperatures of said length of cable at a predetermined point thereof spaced from said current carrying means and that the yielding time versus current characteristic of said solder means is spaced from the insulation damage versus current characteristic of said length of cable throughout the entire load and overload range thereof.

14. A protective device for preventing overheating of a conductor in electric power circuits comprising a tubular housing, separate contact means within said housing, spring biasing means tending to separate said contact means, solder means conductively interconnecting and normally restraining said contact means in the closed position thereof, the yielding point of said solder means being in the order of the highest temperature which organic insulating materials are capable of withstanding continually, arc quenching means for extinguishing the arc formed between said contact means upon separation thereof, and current carrying means including connector means for serially connecting said contact means into an electric circuit, said current carrying means having a sufficiently large and sufficiently uniform cross-section to preclude under any load and overload condition the generation of heat therein at such a rate as would be required to cause yielding of said solder means under the action of said heat.

15. A protective device for rubber-insulated cables comprising a tubular housing, separable contact means within said housing, spring biasing means tending to separate said contact means, solder means conductively interconnecting and normally restraining said contact means in the closed position thereof, the yielding point of said solder means being in the order of the highest temperature that cable rubber insulation is capable of withstanding continually, current carrying means including connector means for serially connecting said contact means into an electric circuit, said current carrying means having a sufficiently large and sufficiently uniform cross-section to so minimize the ratio of the rate of heat generation therein to the rate of heat dissipation therefrom that the temperature of said solder means is precluded from being significantly affected by heat generated in said current carrying means, a plurality of fusible links having a fusing point above the yielding point of said solder means adapted to shunt the arc gap formed upon separation of said contact means, and a pulverulent arc quenching filler within said housing surrounding said contact means, said solder means and said plurality of links.

16. A protective device for preventing overheating of conductors in electric power circuits comprising a tubular housing, a pair of bar connectors on opposite ends of said housing, a pair of relatively heavy metal elements each conductively connected to one of said pair of bar connectors and each adapted to close one of the ends of said housing, one of said pair of bar connectors being connected to and supported by one of said pair of metal elements, a metallic sub-housing within said housing supported by the other of said pair of metal elements, a pulverulent arc-quenching filler within said housing outside of said sub-housing, a biasing spring within said sub-housing, a contact movable relative to said sub-housing under the action of said biasing spring, a first solder joint for connecting said contact to said sub-housing, and a second solder joint for connecting said contact to one of said pair of metal elements.

17. A protective device as specified in claim 16 comprising fusible link means having a fusing point above the yielding point of said first and said second solder joint, said link means being surrounded by said arc-quenching filler and interconnecting said one of said pair of metal elements with said sub-housing.

18. A protective device for rubber-insulated cables comprising a tubular housing, a metallic sub-housing within said housing, a pulverulent arc-quenching filler within said housing outside of said sub-housing, a biasing spring within said sub-housing, a first contact movable relative to said sub-housing under the action of said biasing spring, a second contact adapted to cooperate with said first contact fixedly arranged adjacent the end thereof remote from said sub-housing, a first solder means for conductively interconnecting said sub-housing and said first contact and for normally restraining said first contact in the closed position thereof, a second solder means for conductively interconnecting said first contact and said second contact and for normally restraining said first contact in the closed position thereof, the yielding point of said first solder means and of said second solder means being in the order of the highest temperature that cable insulating rubber is capable of withstanding continually, and current carrying means including connector means for serially connecting said sub-housing, said first contact and said second contact into an electric circuit, said current carrying means being of sufficiently large and sufficiently uniform cross-section to minimize the generation of heat therein to preclude the temperature of said first solder joint and the temperature of said second solder joint to be significantly affected by the heat generated in said current carrying means.

19. A protective arrangement for preventing overheating of a conductor in an electric power circuit comprising a conductor insulated by an organic insulating material, and a protective device including a housing, separable contact means within said housing, spring means tending to separate said contact means, solder means conductively interconnecting and normally restraining said contact means in the closed position thereof, the yielding point of said solder means being in the order of the highest temperature which said insulating material insulating said conductor is capable of withstanding continually, arc-quenching means for extinguishing the arc formed between said contact means upon separation thereof, and current carrying means including connector means for serially connecting said conductor and said contact means, said current carrying means being adapted to generate relatively small amounts of heat and to conduct relatively large amounts of heat from said conductor to said solder means to cause the temperature of said solder means to be predominantly governed by the temperature of said conductor.

20. A protective arrangement for preventing overheating of a rubber insulated cable comprising a rubber insulated cable and a protective device serially arranged with said cable in an electric circuit, said protective device including a housing, a metallic sub-housing coaxially arranged within said housing, a pulverulent arc-quenching filler within said housing outside of said sub-housing, a biasing spring within said sub-housing, a first contact within said housing movable relatively to said sub-housing under the action of said biasing spring, a second contact within said housing adapted to cooperate with said first contact and fixedly arranged adjacent the end thereof remote from said sub-housing, a first solder means for conductively interconnecting said sub-housing and said first contact and for normally restraining said first contact in the closed position thereof, a second solder means for conductively interconnecting said first contact and said second contact and for normally restraining said first contact in the closed position thereof, the yielding point of said first solder means and of said second solder means being in the order of the highest temperature which the rubber insulation on said cable is capable of withstanding continually, and current carrying means including connector means for serially connecting said cable, said sub-housing, said first contact and said second contact, said current carrying means being adapted to generate relatively small amounts of heat and to conduct relatively large amounts of heat from said cable to said first solder means and to said second solder means to cause the temperatures of both said solder means to be predominantly governed by the temperature of said conductor.

21. A protective arrangement for preventing overheating of a cable in an electric power circuit comprising an electric power circuit, an insulated cable arranged in said circuit and forming a gap between two spaced terminals thereof, a first pair of connector elements each secured to one of said pair of terminals, relatively movable contact means spring biased to the open position thereof arranged between said first pair of connector elements, solder means conductively interconnecting said contact means and normally restraining said contact means in the closed position thereof, the yielding point of said solder means being in the order of the highest temperature which the insulation of said cable is capable of withstanding continually, a housing accommodating said contact means and said solder means, means within said housing for extinguishing the arc formed upon separation of said contact means including a pulverulent arc quenching filler surrounding said solder means, current carrying means including a second pair of connector elements each in cooperative relation with one of said first pair of connector elements for serially connecting said cable and said contact means into said circuit, said current carrying means being adapted to generate but relatively small amounts of heat and to conduct relatively large amounts of heat from said cable to said solder means to cause the temperature of said solder means to be predominantly governed by the temperature of said cable, a bag of impervious material enclosing said first pair of connector elements, said housing and said second pair of connector elements and lapping the insulation of said cable, and a pair of windings of insulating tape each extending over the lapping portion of said bag to provide a watertight joint.

22. A protective arrangement for preventing overheating of a cable in an electric power circuit comprising an electric power circuit, an insulated cable arranged in said circuit and forming a gap between two spaced terminals thereof, a first pair of connector elements each secured to one of said pair of terminals, a housing arranged between and in alignment with said first pair of connector elements, a metallic sub-housing coaxially arranged within said housing, a pulverulent arc-quenching filler within said housing outside of said sub-housing, a helical biasing spring within said sub-housing, a first contact within said housing movable relatively to said sub-housing under the action of said biasing spring, a second contact within said housing adapted to cooperate with said first contact fixedly arranged adjacent the end thereof remote from said sub-housing, a first solder means for conductively interconnecting said sub-housing and said first contact and for normally restraining said first contact in the closed position thereof, a second solder means for conductively interconnecting said first contact and said second contact and for normally restraining said first contact in the closed position thereof, the yielding point of said first solder means and the yielding point of said second solder means being in the order of the highest temperature which the insulation of said cable is capable of withstanding continually, fusible link means for conductively connecting said sub-housing and said second contact to shunt said first contact, said link means having a fusing point higher than the yielding point of said first solder means and said second solder means, an arc-quenching pulverulent filler within said housing surrounding said link means, said first solder means and said second solder means, current carrying means including a second pair of connector elements projecting from opposite sides of said housing and cooperatively engaging said first pair of connector elements for serially connecting said cable, said first contact and said second contact into said circuit, said current carrying means being adapted to generate relatively small amounts of heat and to conduct relatively large amounts of heat from said cable to said first solder means and to said second solder means to cause the temperature of both said solder means to be predominantly governed by the temperature of said cable, a rubber bag enclosing said first pair of connector elements, said second pair of connector elements and said housing and lapping the insulation of said cable, and a pair of windings of insulating tape each extending over the lapping portion of said rubber bag to provide a watertight joint.

23. An arrangement for the protection against overheating of a conductor in an electric power distribution system comprising an electric conductor, means for insulating said conductor, a housing, means serially connected with said conductor for carrying current from said conductor through said housing to the side thereof remote from said conductor, the resistance of said current carrying means being throughout the entire length thereof of an order precluding the formation of any zone of increased temperature relative to the temperature of said conductor at the end thereof adjacent said housing, said current carrying means comprising a pair of separable contacts biased to the open position thereof and solder means for conductively interconnecting said contacts to normally preclude separation thereof, the yielding point characteristic of said solder means being below the danger temperature characteristic of said means for insulating said conductor.

24. An arrangement for the protection against overheating of the insulation of a cable comprising an electric circuit, a cable including insulating means enveloping the core thereof arranged in said circuit, a tubular housing adjacent said cable, a pair of relatively movable cooperating contact means and spring means for biasing said contact means to the open position thereof arranged within said housing, solder means for conductively interconnecting said pair of contact means and for normally restraining said pair of contact means in the closed position thereof, the yielding point of said solder means being below the critical temperature which if maintained continuously would endanger said insulating means enveloping said core of said cable, and current-carrying means including a pair of terminals projecting beyond opposite ends of said housing for connecting said pair of contact means and said solder means into said circuit of said cable, the resistance of the current path formed by said pair of contact means, said solder means and said current-carrying means being sufficiently low to cause the temperature of said solder means to be preponderantly governed by $i^2.r$ losses in said cable and to be relatively unaffected by $i^2.r$ losses occurring in the portion of said circuit situated between said terminals of said current-carrying means, the thermal characteristics of said cable and the thermal characteristics of said pair of contact means, said solder means and said current-carrying means being so correlated that the temperature at any point of said portion of said circuit situated between said terminals of said current-carrying means never exceeds the temperature at any point of said core of said cable.

25. An arrangement for the protection against overheating of the insulation of a cable comprising an electric circuit, an insulated cable arranged in said circuit, a tubular housing adjacent said cable, a pair of relatively movable cooperating contact means within said housing, solder means for conductively interconnecting said pair of contact means and for normally restraining said pair of contact means in the closed position thereof, contact separating means within said housing operative to separate said pair of contact means upon reaching by said solder means of a predetermined temperature below the critical temperature which if maintained continuously would endanger said cable, and current-carrying means including a pair of terminals projecting beyond opposite ends of said housing for connecting said pair of contact means and said solder means into said circuit of said cable, the resistance of the current path formed by said pair of contact means, said solder means and said current-carrying means being sufficiently low to cause the temperature of said solder means to be preponderantly governed by $i^2.r$ losses in said cable and to be relatively unaffected by $i^2.r$ losses occurring in the portion of said circuit situated between said terminals of said current-carrying means, the thermal characteristics of said cable and the thermal characteristics of said pair of contact means, said solder means and said current-carrying means being so correlated that the temperature at any point of said portion of said circuit situated between said terminals of said current-carrying means never exceeds the temperature at any point of said core of said cable.

WILLIAM S. EDSALL.
PAUL C. HITCHCOCK.

References Cited in the file of this patent

UNITED STATES PATENTS

| Number | Name | Date |
|---|---|---|
| 2,296,627 | Brown | Sept. 22, 1942 |
| 2,321,711 | Taylor | June 15, 1943 |